Nov. 1, 1927.
J. A. HICKS
1,647,227
AUTOMATIC CONTROL SYSTEM FOR LOCKS
Filed Jan. 23, 1924 6 Sheets-Sheet 4
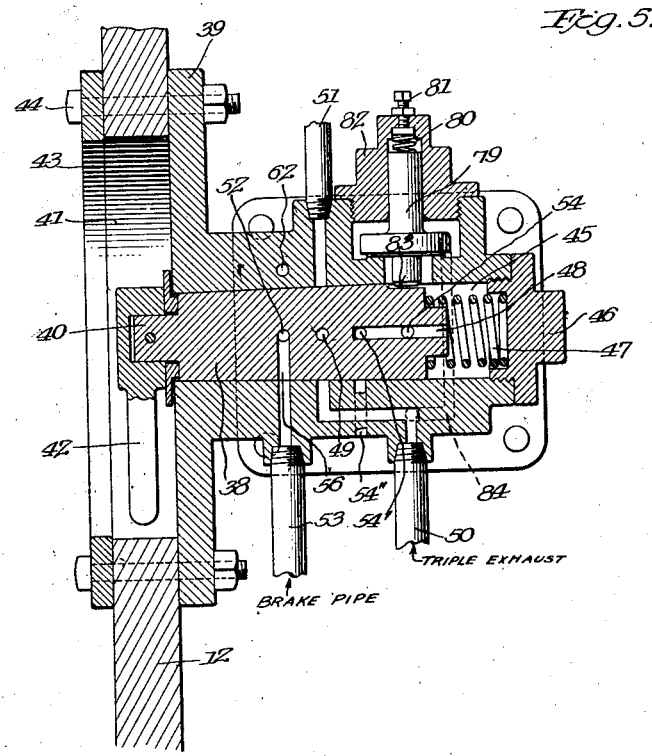
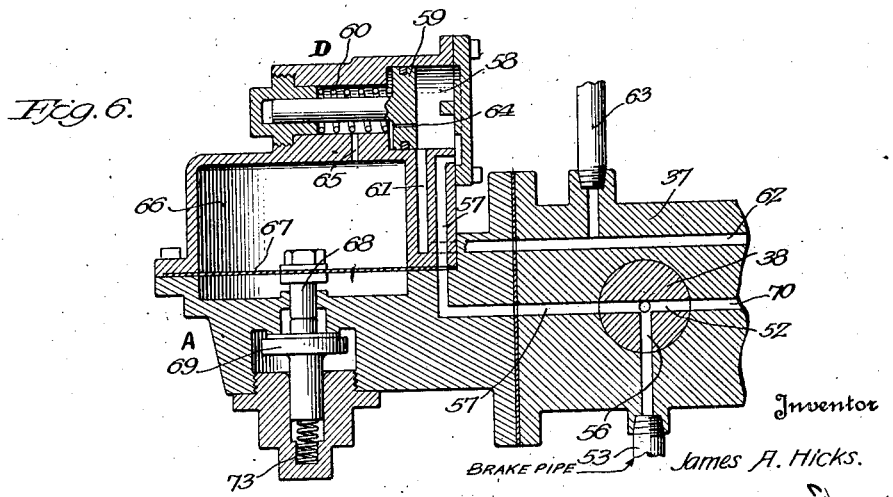

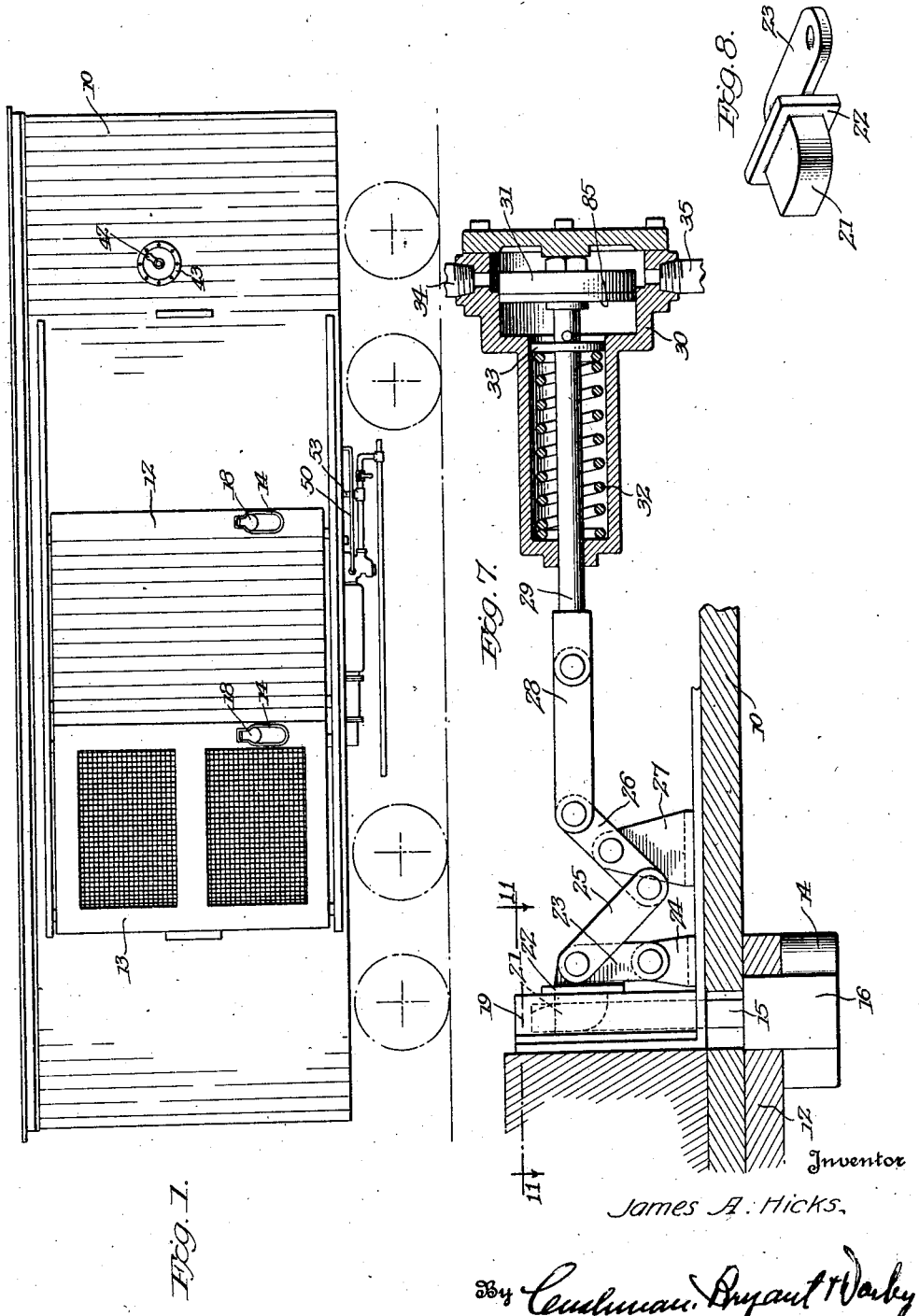

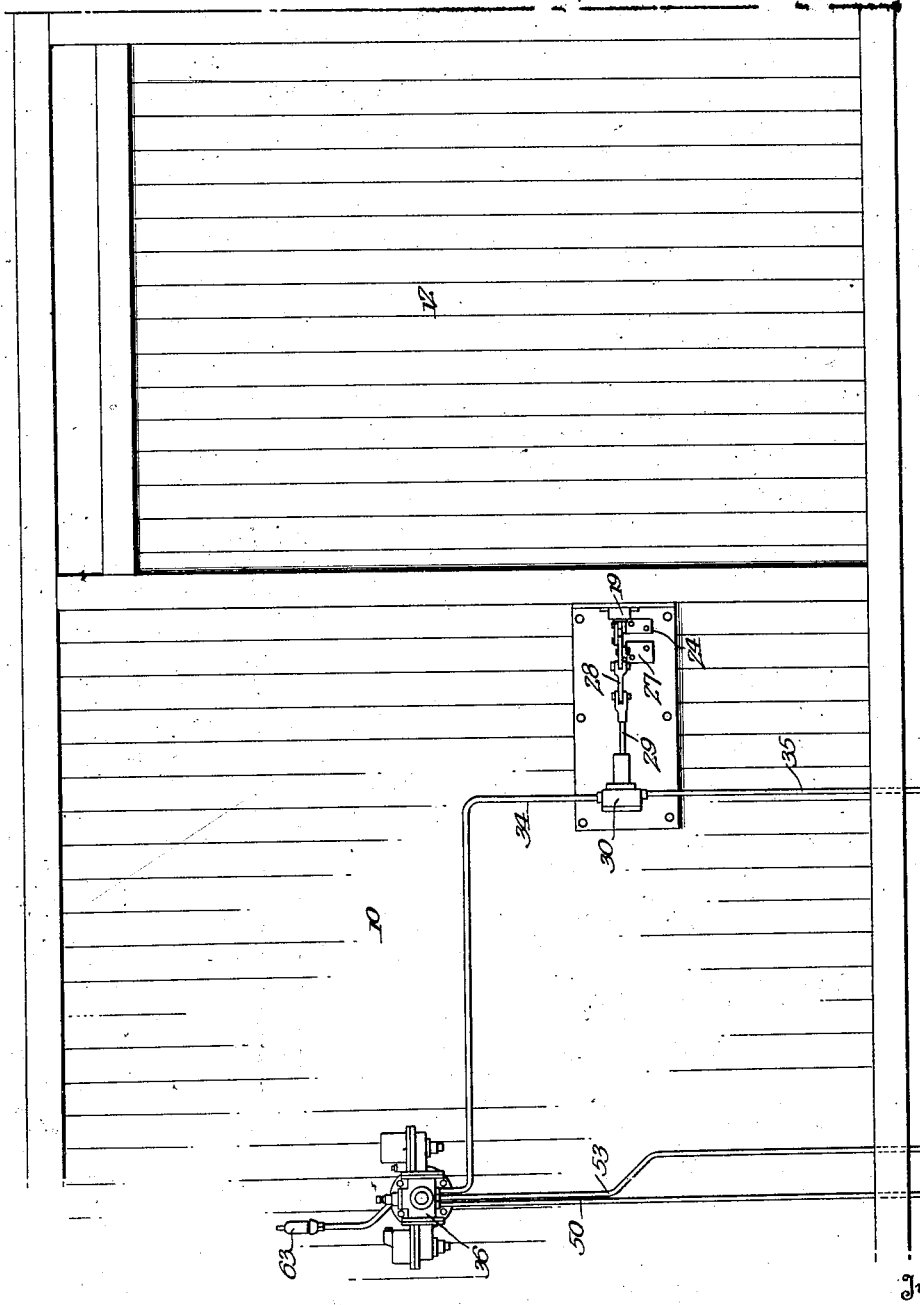

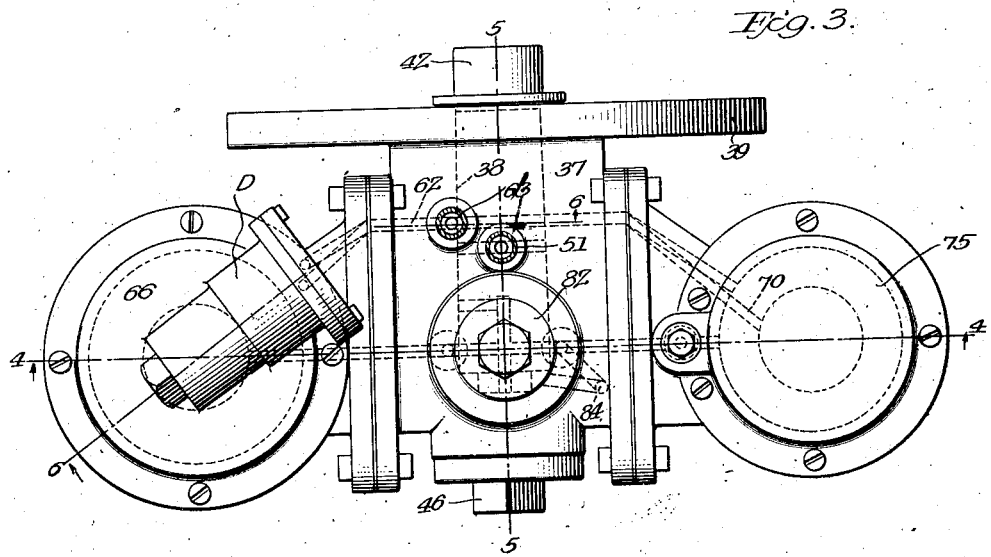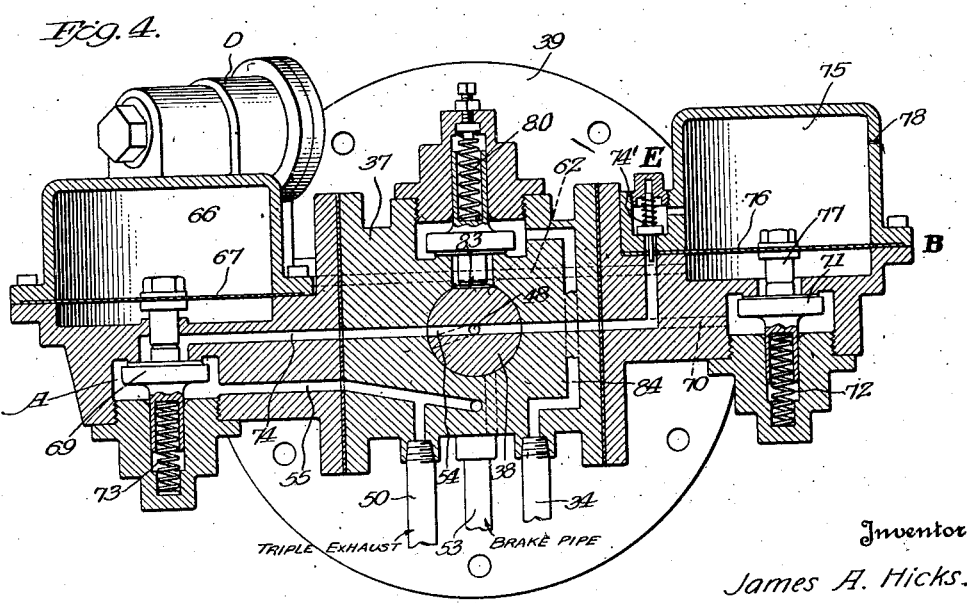

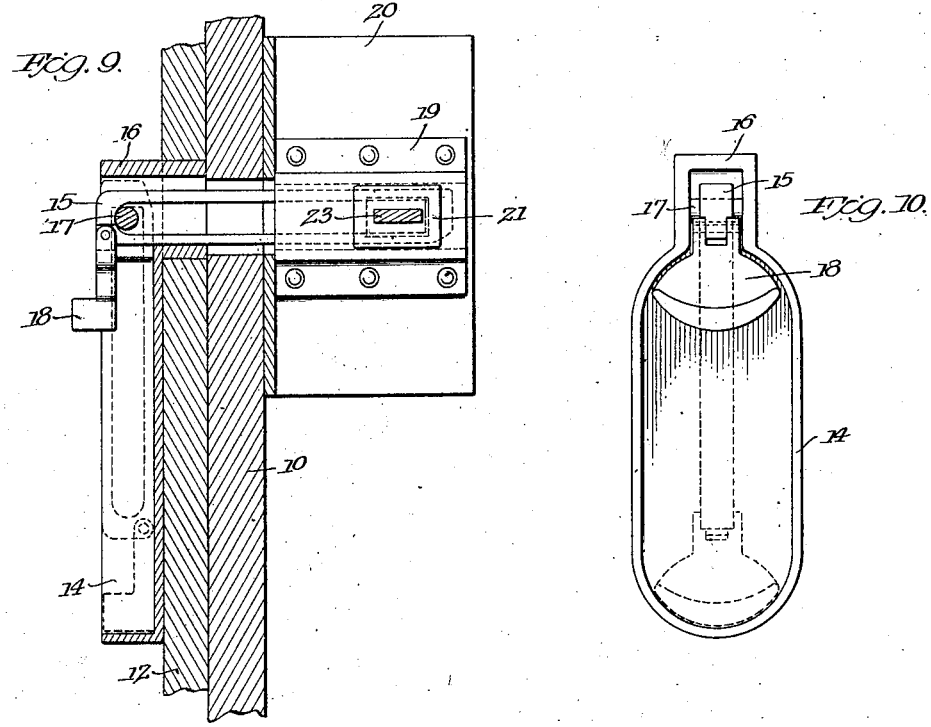
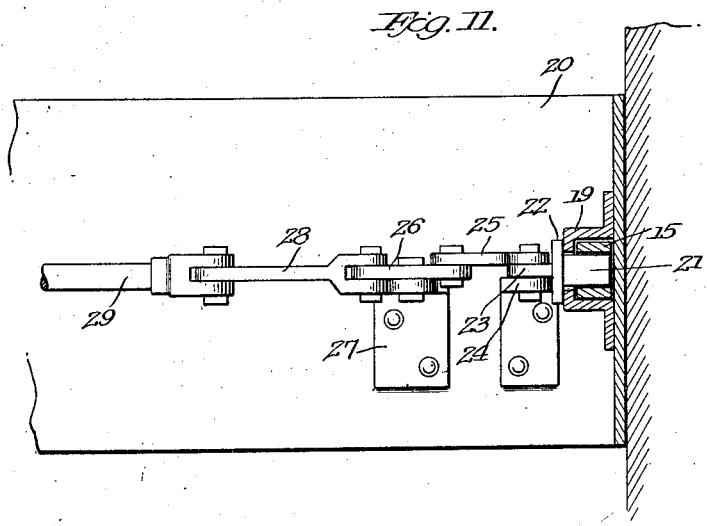

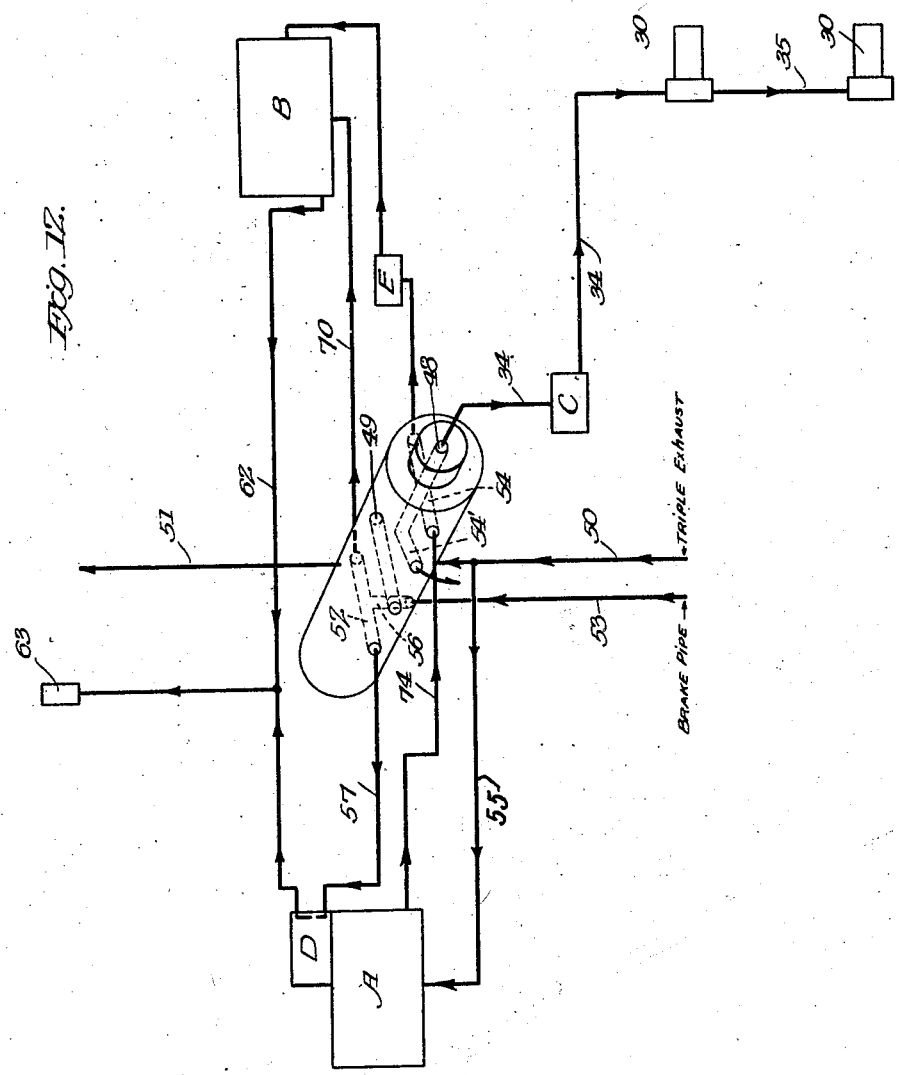

Patented Nov. 1, 1927.

1,647,227

UNITED STATES PATENT OFFICE.

JAMES AMOS HICKS, OF ATLANTA, GEORGIA, ASSIGNOR, BY DIRECT AND MESNE ASSIGNMENTS, TO AUTOMATIC CAR LOCK COMPANY, OF ATLANTA, GEORGIA, A CORPORATION OF GEORGIA.

AUTOMATIC CONTROL SYSTEM FOR LOCKS.

Application filed January 23, 1924. Serial No. 687,988.

The present invention relates to a control system for locks.

It is designed particularly for, and will be shown in the present disclosure in connection with, car door locks. It is to be understood, however, that the present embodiment is illustrative, and not restrictive, and that the system may be used wherever lock control, regardless of specific purpose, such as will be described, is desirable.

It has for its object to provide means for so controlling locks from a source of power (in the present example, compressed air), that accidental derangement and consequent accessibility of the locked receptacle, or malicious tampering with the locks will be avoided.

In the example herein disclosed, the invention is shown as applied to a railroad vehicle, the term vehicle to be broadly construed, and it is to be understood, also, that the invention is not limited to vehicles. Furthermore, the invention is illustrated and described in connection with the usual brake equipment for railway cars, it being obvious that it will be applicable to other types of air braking apparatus; that it is not necessarily confined to the illustrated type here shown, and that it may be used with pressure and release systems, whether or not they are carried by vehicles.

Additionally, the invention contemplates the provision of an audible signal which will at once give warning of any actuation of the lock and by which attention will be called to any attempt, by unauthorized persons, to break the lock and enter the car.

The apparatus is so coupled into the brake line that it will be at all times under the control of the engineer who, by proper manipulation of his air, can control release of the lock and prevent unauthorized entrance to the car, and can so manipulate the air as to maintain the car locked and the audible signal in condition for warning.

It will be obvious, from the description which follows, that the apparatus can be handled from any compressed air plant where sufficient volume and pressure can be generated to effect operation of the same.

In order that the development may be clear to those skilled in the art, I have shown, in the accompanying drawings, one embodiment of my invention, but it will be understood, of course, that changes in construction may be made, and mechanical expedients the equivalent of those herein shown adopted, and still be within the range of my invention.

In said drawings:—

Fig. 1 is a side elevation of a freight car to which my invention is applied.

Fig. 2 is a side elevation of so much of the inside of the car as is necessary to illustrate the relation of the apparatus to the door, and the layout of the apparatus is shown diagrammatically.

Fig. 3 is a top plan view of the lock control device.

Fig. 4 is a view in cross section, substantially upon the line 4—4 of Fig. 3.

Fig. 5 is a view in cross section substantially on the line 5—5 of Fig. 3.

Fig. 6 is a sectional view, substantially on the line 6—6 of Figure 3.

Fig. 7 is a view in plan of the lock proper, parts being in section, for clearness of illustration.

Fig. 8 is a detail perspective view of the bolt.

Fig. 9 is a vertical sectional view of the lock.

Fig. 10 is a front view of the lock operating handle and its hanger plate.

Fig. 11 is a view in side elevation, parts of the construction being in section, of the bolt operating levers on substantially the line 11—11 of Fig. 7.

Fig. 12 is a diagram to illustrate conventionally, and without regard to mechanical construction, the layout of the system and the routing of the air, the manually operatable plug valve being represented in the position shown in Figs. 4 and 5.

Referring to the drawings by numerals, like numerals indicating like parts in the several views, 10 indicates a car which is equipped, as illustrated, with the usual, or any suitable air braking system. This braking system is well understood by those skilled in the art, and no detailed description or illustration of it is made, as its construction and functions are in no way changed. It will be referred to, therefore, only so far as is necessary to illustrate my invention.

The lock proper, which is illustrated in Figs. 2, 7, 8, 9, 10 and 11, will be first described, and then the operating devices for actuating that lock will be discussed.

While I have shown a particular type of lock, it will be understood that the lock per se may be of different types, so long as it is adaptable to the operating mechanisms which I have invented for lock handling.

The car will be provided with any type of door, and in the present illustration I have shown a car of the double door type, having the full door 12, and the vent door 13, this being a type commonly in use, so that, dependent on the character of the goods, the full door or the vent door may be used. It is to be understood, however, that the particular type of door is not material.

Secured to the car door, and, in the present instance, to both the full door and the vent door, is a hanger plate 14, provided with a handle formed as a lock loop 15 fitted to slide through the upper part 16 of the hanger plate, there being a cross bar 17 on the hanger plate for the loop bar 15. The hanger plate will be secured to the outside of the door, and the lock loop, which is provided with an operating handle 18, will, when in locking position, lie in the full line position shown in Fig. 9, passing through a suitable aperture in the wall of the car, and sliding in a keeper 19 suitably mounted in a supporting housing 20 inside of the car. At its forward end the lock loop is preferably beveled, both at one side and at its bottom, in order that when it is thrust into the full line position shown, it will easily ride into its keeper and past the locking bolt.

When the lock loop is in the dotted line position shown in Fig. 7, and full line position shown in Figs. 9 and 11, it is in position to be engaged by the locking bolt and the door secured. The bolt 21 is here shown as a latch bolt, and will be formed as shown in Fig. 8, where it will be seen that the face of the bolt is beveled. It is formed integral with the lever section 23, so that when the lock loop 15 is forced inwardly, it will engage the beveled front face of the bolt 21 and force it back against the tension of a spring, presently to be described, until the lock loop is in its innermost position, whereupon the bolt 21 will immediately snap into the lock loop and the car will be locked. It is preferably flanged at 22 to limit its movement into the lock loop, this flange 22 abutting the keeper 19 in which the lock loop 15 slides, there being a suitable aperture in this keeper through which the bolt 21 passes. The bolt 21 may be suitably mounted for movement, and is here shown with its lever section 23 pivotally mounted on a support 24 attached to the inside wall of the car. Coupled to this bolt 21 is a connecting link 25 which, in turn, is pivotally connected with a lever 26 pivotally mounted on a support 27. The lever 26 is pivotally connected with a link member 28, which, in turn, is pivotally coupled to a piston rod 29 mounted for reciprocation in a piston chamber 30, having a spring housing, said piston rod having, at its other end, a piston 31. Surrounding the piston rod 29 is an actuating spring 32 which tends normally to hold the parts in the position shown in Fig. 7, the spring 32 being mounted between the bottom of the spring housing, and a disk 33 secured to the piston.

In the position shown in Fig. 7, the parts are in locking position, the spring 32 being under expansion, so as to force the piston to the position shown in Fig. 7, and tending to straighten the line of links and levers heretofore described, which straightening action thrusts the bolt 21 forward into locking position in the lock loop.

This entire locking mechanism will be preferably housed within the casing 20 inside of the car, so that it will be protected from accident or tampering.

This completes the description of the lock proper, and, as before stated, it is to be understood that the lock mechanism which has been described as connected to and operated by the piston rod 29 may be varied without departing from my invention, for it is obvious that different styles of locks, or lock control devices, could be coupled to and manipulated by the movable piston rod.

The devices for delivering air to and releasing it from the piston chamber 30 for actuating the piston will now be described, and the manner in which they are coupled into the air brake equipment will be set forth, reference being had particularly to Figs. 1 to 6, inclusive, and Fig. 12 of the drawings.

Referring to Fig. 2, the layout of the lock control system is shown. The piston chamber 30 and its associated lock operating connections are shown conventionally, and a feed pipe 34 is shown leading to the piston chamber 30 from the operating valves, and a pipe 35 is shown leading from the piston chamber 30. This pipe 35 will lead, with the ordinary car having a door on each side, across to the door on the opposite side of the car, where the operating piston 30 and the lock will be duplicated. The pipe 35 may be led across in any suitable way, either overhead, or beneath the floor of the car.

The pipe 34 leads from the automatic control device shown in elevation at 36, Fig. 2, which control device is illustrated in detail in Figs. 3 to 6, inclusive.

The control device comprises a valve casing 37, in which is mounted a rotary valve or turning plug 38, the casing 37 being bolted or otherwise suitably secured to the inside of the car by means of a flange 39, with one end of the valve 40 projecting into an aperture 41 formed in the side of the car, and provided with a manipulating handle 42 by means of which the plug valve 38 may be manipulated. Preferably the aperture 41 will be reinforced and bordered by a ring plate 43, which receives the bolts 44 by which the device is secured to the car.

Of course, the details of this exposed operating handle, and its mountings may be varied, it being here shown as a simple lever type handle for rotating the plug valve 38.

The plug valve 38 is mounted in the chamber 45 of the casing 37, the open end of which is closed by a screw plug or cap 46, and a spring 47 interposed between the cap and the plug tends always to hold the plug snugly to its seat, it being observed that the plug tapers outwardly toward the outside of the car, as best shown in Fig. 5.

The plug valve 38 is provided with three cross passages (52, 49, 54, the first of which has a lateral branch 56), and one axially disposed passage (48 that intersects the passage 54 and is provided at its inner end with a radially extending section 54'), the relation of which, to the rest of the system, can be best determined by consideration of the diagrammatic view, Fig. 12, which is designed to show, in diagram, the layout of the system, and the direction of flow of air, without any attempt to show mechanical construction. It will be understood, of course, that the laying in of the ports and passages in valves of this kind may be varied, and so long as they function properly, their location or arrangement is unimportant.

The axially disposed passage 48, in the plug valve, opens into the chamber containing spring 47 which, through a passage 84 controlled by a valve 79, communicates with a pipe 34 that leads to the lock operating cylinder 30, heretofore described, and furnishes the power for actuating the piston, there being interposed other cooperating elements which will be hereinafter described.

The cross passage 49 in the plug valve connects the triple exhaust pipe 50 with the retaining valve pipe 51 when the plug valve 38 is turned to normal position, that is, substantially at right angles to the position shown in the diagram, Fig. 12. This leaves the retaining valve and triple exhaust coupled for normal train operation, exactly as at present, so that there is no interference whatever with the retaining valve, and it will perform the usual function which it performs in air brake service.

The cross passage 52 when the valve 38 is rotated to the position shown in Fig. 12 delivers brake pipe pressure coming from the brake pipe 53 to the operating devices for sending the air to the various control valves provided for operating the lock.

The cross passage 54, through the plug valve, connects (when the valve is positioned as shown in Fig. 12) the triple valve exhaust pipe 50 with the control valves and diaphragm chambers which will now be described, it being understood that the plug valve 38 may be manipulated to couple and bring into action, or to cut out of action the several instrumentalities which I will now described.

The operation of the device is initiated by brake pipe pressure coming through the brake pipe 53 heretofore referred to, which pipe 53 couples into the brake pipe of the ordinary train equipment. With the brakes in release, and the brake pipe of the train equipment fed up, the valve 38 will be turned to the position illustrated in which the connection between the triple exhaust pipe 50 and retaining valve pipe 51 normally provided by the passage 49 is broken and the branch 56 of passage 52 is brought into communication with the brake pipe 53. With the valve in this position brake pipe pressure will pass, by passage 57, to the piston chamber 58 and move the piston 59 over against its spring 60, to the full line position shown in Fig. 6. As the piston 59 moves over, it will uncover the passage 61 leading from the piston chamber, and brake pipe pressure will flow, by passage 61 and passage 62, to the audible signal, that is, the whistle, or equivalent sounding device 63, which may be located inside the car, and suitably placed and housed so that it will be protected.

The piston 59 is provided with a port 64 leading to the chamber in which the spring is housed, and this chamber communicates, by a passage 65, with a diaphragm chamber 66, the diaphragm 67 in which is provided with a valve operating pin 68, bearing upon and adapted to open a valve 69 when pressure on the diaphragm 67 forces it downwardly. When the brake pipe pressure in the piston chamber 58 is reduced to the point where it will not counterbalance the spring 60, the spring will move the piston 59 over, closing the outlet passage 61, and air pressure through this passage and the passage 62 to the whistle 63 will be cut off.

The plug valve 38, when in the position shown referred to and in Fig. 6, also delivers brake pipe pressure by passage 70 to a chamber beneath the valve 71 on the other side of the control device, which valve 71 is normally closed by the spring 72, so that during the operation just described of initially blowing the whistle, brake pipe pressure has been standing below the valve 71.

It will be obvious that when brake pipe pressure has been reduced, as described, by blowing the whistle, that such reduction will effect a "service" application of brakes, and that as soon as the piston 59 moves back, as described, and shuts off the passage 61, the pressure in the brake pipe will be sufficient to release the brakes.

The time interval during which the whistle will blow and brake application will be made, can, of course, be varied, dependent on the area of the passage 64 in the piston 59. As one example, I have, in practice, arranged for a twenty-five (25) second interval between the moving over of the piston 59 to permit brake pipe pressure to flow to the passage 61 and the whistle, and the return of that piston 59 by the spring 60. This time interval will be figured according to the needs of the situation, and can be made, of course, greater or less, as may be desired.

As the pressure accumulates in the diaphragm chamber 66, it will move the diaphragm 67 down, and the diaphragm pin 68 will unseat the valve 69, which is normally held closed by a spring 73 below it. When the plug valve 38 is manipulated as just described, the warning sounded; brake application made; and, on feed up of brake pipe, a release of brakes brought about, brake cylinder exhaust through the triple valve will pass, by pipe 50, which is coupled into the triple valve on the exhaust side, to the valve 69, which has been opened by pressure on the diaphragm 67, as heretofore described. This exhaust pressure from the triple valve will pass, by passage 74, to the plug valve 38, and, by passage 54, in the plug valve, go past the non-return check valve 74' to a second diaphragm chamber 75, and stand above the diaphragm 76. The diaphragm 76 has a valve actuating pin 77 engaging the valve 71 normally held closed by brake pipe pressure, and by the spring 72. The brake cylinder pressure coming from the triple exhaust to chamber 75 above the diaphragm 76 will, because of the difference in area, force the diaphragm down and open the valve 71. Brake pipe pressure will then (through passages 56, 70) flow past the valve below the diaphragm, and, by passage 62, go to the whistle 63, and again give an audible signal, and, at the same time, because of the consequent reduction of pressure in brake pipe, effect an application of brakes. The diaphragm chamber 75 is provided with a blow down port 78 similar to the port in the piston 59, and, through this port 78, the pressure in the diaphragm chamber 75 will gradually bleed off until the spring 72 and the brake pipe pressure below the valve 71 will close that valve, causing cessation of the whistle, and, as the valve 71 is closed the brake pipe will be fed up exactly as it was fed up after reduction through the port 64 in the piston 59, release of brakes will result.

The time interval for this second warning and brake application will be figured according to the needs of the situation by making the blow down port 78 larger or smaller. In practice, I have figured a time interval of twenty-five (25) seconds, but, obviously, this can be changed, if desired.

The triple exhaust pressure which, as has been pointed out, traverses the plug valve 38 by the passage 54, and passing the check valve 74', goes to the diaphragm chamber 75, is also routed by the axial passage 48 in the plug valve, as best shown in Fig. 5, to the chamber 45 behind the plug valve, and stands against a valve 79 normally held to its seat by the spring 80, an adjusting screw 81 being provided in the top of the sleeve or valve housing 82 so that the tension of the spring 80 may be adjusted to meet different pressures. I have found, in practice, that a pressure of thirty (30) pounds beneath this valve is sufficient to give a proper functioning of an operative equipment built by me, but it is clear that, in practice, other pressures may be used, if desired.

The tail of the valve 79 passes through a suitable aperture in the valve casing into operative relation with respect to the plug valve 38, as clearly shown in Figs. 4 and 5. Pressure coming from the chamber 45 will raise the valve 79 against the tension of its spring, and passing that valve, will go, by passage 84 and pipe 34 to the piston chamber 30 of the lock cylinder, so that there will be thrown behind the piston 31 the unlocking pressure, in this instance, thirty (30) pounds, which is being used.

The non-return check valve 74', heretofore referred to, has the function of preventing manipulation of the control device to effect unlocking, by trapping the air which passes it in the diaphragm chamber 75, so that it cannot return, but must actuate the diaphragm 76, and the valve 71, as described, until it is blown down through the port 78. Without this non-return check, it might be possible for anyone skilled in the manipulation of the device and knowing its manner of operation, to turn the valve 38, so as to give the first warning of the whistle, due to brake pipe pressure coming from the piston chamber 58 and passage 61, and effect an application of brakes. If this first warning and application was not noticed and the brake pipe was fed up and brakes released, the triple exhaust pressure would pass to the diaphragm chamber 75. Thereupon, if the non-return check valve were not present, the plug could be returned to normal, and the pressure in diaphragm chamber 75 thrown to atmosphere before it could actuate that diaphragm 76, and the valve 71, and give the second warning and second application of brakes. By interposing this non-return check, however, I have effectually guarded against any such manipulation of the device, for when the triple exhaust pressure has once gone to the diaphragm chamber 75, it cannot return, and must exert its action upon the diaphragm 76 until it has been bled down through the port 78, this resulting in the second warning and second application of brakes.

When this pressure is thrown behind the piston 31, it will be forced over, as has been heretofore described, against the spring 32, and, through the system of links and levers set forth, will pull the bolt 21 from the lock loop 15, and that lock loop, by means of the manipulating handle hereinbefore described, may be drawn out and the car door unlocked.

The valve 79 is closed by the spring 80, so as to close the port leading from the chamber 45 when the plug valve 38 is turned to operating position for unlocking the car, there being provided a cut-away or flattened surface 83 on that valve, as clearly shown in Figs. 4 and 5, which will give clearance for the tail of the valve 79, and permit that valve to seat, so that, while the pressure coming from the chamber 45 can lift the valve 79 and pass, by passage 84 and pipe 34, to the lock cylinder, it will be retained and cannot return past the valve 79. However, when the plug valve 38 is turned to inoperative position, its cylindrical surface will engage the tail of the valve 79 and lift the valve from its seat, so as to permit the air to return, and, by chamber 45, axial passage 48, and cross passage 54′, pass to atmosphere through a suitable atmospheric passage 54″, as shown in Fig. 5, thus releasing pressure from the lock cylinder and permitting the spring 32 to throw the bolt to locking position.

The piston 31 is provided with a valve seating surface 85 which, when the piston 31 is thrown over, seats snugly against the bottom of the piston chamber and seals the spring housing chamber, so that there will be no leakage of air, and the lock may be held open under pressure from the control device for a very considerable length of time, I having found, in practice, that with a well set up, operative device, I have been able to retain pressure in the control device and lock cylinder for a period of ninety-six (96) hours.

In the application of my invention shown in Fig. 1, where I have illustrated a double door arrangement, that is, a full door 12, and a vent door 13, each door will have a lock loop 15, such as has been described, and each lock loop will be engaged by the same bolt actuated from the same lock cylinder, it being understood that in the position shown in Fig. 1, the door 12 is in use or positioned across the opening in the wall of the car. When the vent door 13 is to be used, the doors will be moved over to the right (Fig. 1), and the vent door 13 brought to proper position to be engaged and held by the lock bolt.

The door on the opposite side of the car will have a corresponding lock arrangement and lock cylinder as has been described, the pipe 35, as hereinbefore stated, crossing the car from one side to the other, and connecting the two lock cylinders.

Obviously, this duplication and tandem arrangement of lock cylinders, all operable from a single control device, can be multiplied, as may be desired.

With the control device in normal position, the locking bolt is, of course, held in place by the spring 32, and being completely housed within the car, is not accessible from the outside, and cannot be tampered with by unauthorized or malicious persons. The locking bolt 21 can be withdrawn from the lock loop 15 only in the manner described by putting brake pipe pressure into the control device, and operating the plug valve manually to set it for unlocking, and then, by air pressure from the triple exhaust, through the various valves and diaphragm chambers heretofore described, throwing such triple valve exhaust pressure into the lock piston cylinder 30.

Manipulation of this plug valve 38 through the handle 42, as heretofore described, initially sounds a warning, as has been set forth, and, because of reduction of brake pipe pressure, makes an application of brakes. This first warning and application, which results from throwing brake pipe pressure behind the piston 59, is followed, after the piston 59 has moved back under the influence of its spring, and, by reason of reduction of pressure in the piston chamber 58, by a second warning and a second application of brakes, due to brake pipe pressure passing the valve 71, as has been heretofore described, and, by passage 62 again going to the warning whistle 63, this second reduction of brake pipe pressure resulting, of course, in a second application of brakes.

This functioning of the control device will continue as long as the plug valve 38 is in the adjusted position represented in the diagrammatic view (Fig. 12), for brake pipe pressure will be alternately built up and reduced, with, at regular intervals, automatic operation of the control device and repeated warnings from the whistle and repeated brake applications.

The diagrammatic view (Fig. 12) shows the relation of the several parts and the path of pressures from the brake pipe and triple exhaust occurring when the lever 42 has been turned to move the plug valve 38 to effect an unlocking of the car doors following a release of the brakes.

As before explained, normally the valve 38 is in a position substantially at right angles to that represented in the diagram and at such time the passage 49 through the plug valve connects the triple exhaust pipe 50 with the retaining valve pipe 51. Under such conditions the branch 56 of the passage 52 is out of alignment with the passages 57 and 70 in the valve case and the passage 54 is out of alignment with the sections of the passage 74.

Therefore, normal manipulation of the brakes by the ordinary control devices will not affect the lock mechanism to which the present invention relates.

When the car brakes are released, however, after the lever 42 has been turned to position the plug valve 38 as shown in the diagram, it will be seen that the brake pipe 53 will be in communication through the branched passage 52, with the passage 57 leading to the valve means D (comprising the piston 59 and its chamber) and also through the passage 70 with the chamber in which is positioned the valve 71, (this being a part of the valve mechanism generally designated B in the diagram and including the valve 71 and diaphragm valve chamber 75).

At the same time the passage 54 in the plug valve 38 forms a portion of the passage 74 leading from above the valve 69 (constituting a part of the valve mechanism designated A on the diagram) to the non-return check valve 74' (represented by E on the diagram) and the chamber 75 of the valve mechanism B.

The chamber in the valve mechanism A beneath the piston 69 is in constant communication with the triple exhaust pipe 50 through the passage 55.

The passage 54 in the valve being in constant communication with the axial passage 48 any pressure through the passage 74 will also pass through the passage 34 and pipe 35 to the two lock mechanisms, after raising the valve 79 (represented at C in the diagram).

The arrows on the diagram show the passage of pressure from the brake pipe and triple exhaust through the several valves that have been hereinbefore described.

This system, as stated at the outset, will function either on a train coupled to a locomotive, or it will function when a block of cars standing in the yard are coupled up to an air plant, such as yards are ordinarily equipped with. The operation will be, of course, identical in each case.

Assuming the train to be made up, the brake pipe will, of course, be fed up to brake pipe pressure, the auxiliaries will be charged, and brakes will be in release, all as is usual with air brake equipment. The control valve for my automatic lock control will be in neutral position, and pressures in the automatic control device will be released, with the locking bolt 21 engaging the lock loop 15 with the car door locked. This condition will continue until the plug valve 38 is, by means of the handle 42, turned so as to throw the air from the brake pipe into the control device. Immediately this is done, the engineer and the train crew, if the turning of the plug be done maliciously and with intent to break the car, will be notified by the blowing of the whistle and the application of brakes of such attempt, and, because of the audible signal, it will be easy to locate the particular car which is being tampered with. As stated, as long as the plug valve 38 remains in position to admit pressure to the control device and throw the lock, the warning whistle and application of brakes will continue intermittently and periodically.

When a car is set out at a station, it is obvious that if there is no air on the car, it would be impossible to unlock it. Since the bolt 21 is held closed and in engagement with the lock loop 15 by means of the spring 32, there is no way of entering that standing car until air pressure has been supplied and the brake pipe pressure built up so as to provide unlocking pressure and permit functioning of the automatic control device, as set forth. If the car was charged with air, it would not be possible to effect unlocking, for if the plug valve 38 is turned and brake pipe pressure is thrown into the control device, the warning whistle would sound, and the brakes would be applied, but there would be no way of releasing those brakes, since there could be no feed up of brake pipe, and as has been pointed out, this device functions for actuating the lock, only upon release of brakes when brake pipe is fed up and brake cylinder exhaust pressure comes from the triple valve, and, by the route described, passes to the lock cylinder.

If the engineer and crew should leave the train standing in the yard, or at a siding, coupled with the engine, a light application of brakes would be made, and the engineer's rotary valve would then be left in what is known as "lap" position, in which position, as is well known in the air brake art, there is no feed up of brake pipe. If, while the train was standing in this condition, the plug valve 38 should be turned, there would be an immediate reduction of brake pipe pressure; a sounding of the whistle, and an application of brakes. The engineer's valve, being in "lap", there would be no feed up to brake pipe, and, therefore, no pressure from the engine to effect release of brakes. When the train, under such conditions, moved out of the station, there would, of course, be a release of brakes, due to build-up of the brake pipe pressure, and if any of the car locks had been tampered with and the plug valve 38 turned in an effort to unlock a car, there would be an immediate warning from the whistle on that particular car, and an application of brakes. It is release of brakes and the passage of brake cylinder exhaust pressure through the triple valve exhaust into the automatic control device and the lock cylinder, that brings about an unlocking of the car, and, in the absence of any building up of pressure in the train pipe to release brakes, this, of course, could not be done.

The operating devices for the plug valve will, of course, be located where they will be accessible from the outside. They may be placed at any convenient or desired point on the side of the car, but I contemplate placing them, as shown in Fig. 1, at a point removed from the end of the car and from the top of the car, so that the control device cannot be operated by anyone riding the train, either from the end ladder or from the top of the car, although, when authorized manipulation of the system is desired, it can be easily reached from the ground. This placing of the operating devices for initiating the action of the automatic control device very effectively guards against operation of the system except from the ground, when the train or cars are either standing still or moving so slowly that it may be done.

The escutcheon or plate 43 may be appropriately marked, or provided with any suitable stops to indicate the limits of movement to which the handle 42 should be thrown in manipulating the automatic control.

In setting out a car, or any number of cars at a station, the crew or the station agent can unlock those cars, if desired, by manipulating the control device, as has been described. If it is thought desirable to leave the cars locked for unloading later, then, when it is necessary to open them, this can be readily done from the locomotive of any train coming into the station by simply coupling from the locomotive across to the car or cars, and charging the car equipment.

Of course, in a large yard, where an air plant is present, the cars may be placed wherever the unloading is to be done, and the air supply coupled on to them. Whether the unlocking of the car is done from a locomotive, or from a yard plant, the operation would be the same. The brake pipe and auxiliaries would be charged, and passing from one car to another, the crew would manipulate the unlocking control device in the manner stated, throwing the air to the lock cylinder, and pulling the lock bolt, and then withdrawing the loop lock. Immediately the loop lock is thrown and the car unlocked, the control device will, of course, be thrown to its normal position.

If, for any reason, it is not desired to immediately open the car, it may be charged with air, and the control device manipulated to throw the air to the unlocking cylinder, which will function to pull the bolt as stated, and the plug valve 38 can then be rotated to what may be termed "lap" position, with its ports and passages blocked so as to retain pressure in the lock cylinder, and hold the bolt withdrawn until such time as it is desired to pull the lock loop and open the car. The control system, as has been heretofore stated, will retain its pressures for a very considerable number of hours after it has once been charged, so that the bolt will remain withdrawn for a considerable period.

Surreptitious unlocking of cars by bringing in a cylinder of compressed air, or by means of a hand compressor would not be feasible, in fact, would be practically impossible, for the reason that such compressed air container or compressor would have to be of such size or capacity as would do the work of a locomotive compressor and supply in pressure and volume as much air as a locomotive or standard plant would supply. It is clear that pilferers could not successfully handle in a yard, without detection, apparatus of this type.

The device does not cause any appreciable drain on air supply, for, in the first place, it is used for only a short time for effecting the unlocking of each car, and, secondly, the volume of air necessary to cause operation of my control system is relatively small.

It will be observed, further, that it in no way interferes with or affects the braking system, simply being tapped on to that system, as other devices are tapped on to the brake system, such as, for example, compression connections for water lifters; compressed air fire door operating devices; automatic locomotive reversers, and the like, all of which are in common use, and none of which affects the action of the brake equipment. Furthermore, the device, when installed on a car, serves to detect and protect against faulty brake equipment, for if the air brake equipment be so deranged and below safety that the control system which I have invented cannot be manipulated, attention is at once forcibly drawn to the faulty condition of that car, due to the fact that it cannot be unlocked, and the necessary repairs will be made.

It will be seen that in the system described, control of the lock depends upon a source of pressure, here shown as brake cylinder pressure coming from the auxiliary, which auxiliary is built up from the brake pipe, which brake cylinder pressure, when released, actuates the lock control mechanism. Additionally, and for the warning features, comprising the audible signal and the brake application, the system depends on a second source of pressure, namely, the brake pipe. Furthermore, and for the proper functioning of the system, it depends on a valve device in the nature of a triple valve, for the control and build up auxiliary and release of brake cylinder, and finally, upon the manually operable control device for initiating and controlling the lock actuating pressures.

It will be understood that while the device is primarily intended for use with railway cars, and the like, as here shown, it is entirely possible to adapt it to lock control wherever needed, by simply supplying the necessary source of air pressure and manipulating it for build up and release so as to give a proper functioning of the automatic control device.

I claim:—

1. In a system of lock control, the combination of a lock, pressure-actuated means controlling said lock, a source of pressure, a pressure container connected with said source, means for reducing pressure in said container, and means to deliver reducing pressure coming from said container to said lock-controlling means.

2. In a system of lock control, the combination of a lock, pressure-actuated means controlling said lock, a source of pressure, a signal operable from said source of pressure, a pressure container connected with said source, means for reducing pressure in said container, and means to deliver reducing pressure coming from said container to said lock controlling means.

3. In a system of lock control, the combination of a lock, pressure-actuated means controlling said lock, a source of pressure, an audible signal operable from said source of pressure, a pressure container connected with said source, means for reducing pressure in said container, and means to deliver reducing pressure coming from said container to said lock controlling means.

4. In a system of lock control, the combination of a lock, pressure-actuated means controlling said lock, a source of pressure, an audible signal connected with said source of pressure, a pressure container connected with said source, means for reducing pressure coming from said source and sounding said signal, means automatically responsive to reduction of pressure from said source to reduce pressure in said container, and means to deliver reducing pressure coming from said container to said lock controlling means.

5. In a system of lock control, the combination of a lock, pressure-actuated means controlling said lock, a source of pressure, an audible signal, manually operable means to reduce pressure coming from said source, and sound said signal, a pressure container connected with said source, and means automatically operable upon reduction of pressure coming from said source to reduce pressure in said container, said manually operable means controlling reducing pressure coming from said container and delivering it to said lock controlling means.

6. In a system of lock control, the combination of a lock, pressure-actuated means controlling said lock, a source of pressure, an audible signal, a valve to reduce pressure coming from said source and sound said signal, a pressure container connected with said source, means automatically operable upon reduction of pressure coming from said source to reduce pressure in said container, and means actuated upon reduction of pressure coming from said source to deliver reducing pressure coming from said container to said manually operated valve, said valve serving to deliver container pressure to said lock controlling means.

7. In a system of lock control, the combination of a lock, pressure-actuated means controlling said lock, a pressure pipe, an audible signal, a pressure cylinder connected with said pipe, manually operable means to reduce pressure in said pipe and sound said signal, a valve responsive to reduction of pressure in said pipe to automatically reduce pressure in said cylinder, and means operable upon reduction of pressure in said pipe to deliver reducing pressure coming from said cylinder to said lock controlling means.

8. In a system of lock control, the combination of a lock, pressure-actuated means controlling said lock, a pressure pipe, an audible signal, a pressure cylinder connected with said pipe, a manually operable valve to reduce pressure in said pipe and sound said signal, a valve operable upon reduction of pressure in said pipe to reduce pressure in said cylinder, and means operable upon reduction of pressure in said pipe to deliver reducing pressure coming from said cylinder to said manually operable valve, said valve being manipulable to deliver such pressure to said lock controlling means.

9. In a system of lock control, the combination of a lock, pressure-actuated means controlling said lock, a pressure pipe, a pressure cylinder, means for reducing pressure in said pipe, a triple valve connecting said pipe and cylinder and acting upon reduction of pressure in said pipe to reduce pressure in said cylinder, and means to deliver the reducing pressure coming from said cylinder to said lock controlling means.

10. In a system of lock control, the combination of a lock, pressure-actuated means controlling said lock, a pressure pipe, an audible signal, manually operable means for reducing pressure in said pipe and sounding said signal, a pressure cylinder, a triple valve connecting said cylinder and pipe and acting upon reduction of pressure in said pipe to reduce pressure in said cylinder, and means operable upon reduction of pressure in said pipe to deliver reducing pressure coming from said cylinder to said lock controlling means.

11. In a system of lock control, the combination of a lock, pressure-actuated means controlling said lock, a pressure pipe, a pressure operated signal, manually operable means for reducing pressure in said pipe, means to deliver reduction pressure coming from said pipe to said signal for a predetermined time, a pressure cylinder connected with said pipe, means operable on reduction of pressure in said pipe to reduce pressure in said cylinder, and means to deliver reducing pressure coming from said cylinder to said lock controlling means.

12. In a system of lock control, the combination of a lock, pressure-actuated means controlling said lock, a pressure pipe, a pressure operated signal, manually operable means for reducing pressure in said pipe, means to deliver reduction pressure coming from said pipe to said signal for a predetermined time, a second and independent means for delivering reduction pressure coming from said pipe to said signal for a predetermined time, a pressure cylinder connected with said pipe, means operable on reduction of pressure in said pipe to reduce pressure in said cylinder, and means to deliver reducing pressure coming from said cylinder to said lock controlling means.

13. In a system of lock control, the combination of a lock, pressure-actuated means controlling said lock, a source of pressure, a pressure operated signal, manually operable means to deliver pressure from said source to said signal, means to cut off pressure to said signal after a predetermined period of time, and means to deliver pressure to said lock controlling means.

14. In a system of lock control, the combination of a lock, pressure-actuated means controlling said lock, a source of pressure, a pressure operated signal, a pressure connection from said source to said signal, a second pressure connection from said source to said signal, manually operable means controlling said connections, means to cut off pressure through said first named signal connection after a predetermined period of time, means to cut off pressure to said signal through said second named connection after a predetermined period of time, and means to deliver pressure to said lock controlling means.

15. In a system of lock control, the combination of a lock, pressure-actuated means controlling said lock, a source of pressure, a pressure operated signal, a pressure connection from said source to said signal, a second pressure connection from said source to said signal, manually operable means controlling said connections, automatic means to cut off the first named connection to said signal after a predetermined period of time, automatic means to cut off said second connection to said signal after a predetermined period of time, and means to deliver pressure to said lock controlling means.

16. In a system of lock control, the combination of a lock, pressure-actuated means controlling said lock, a pressure operated audible signal, a pressure connection from said source to said signal, a second pressure connection from said source to said signal, manually operated means controlling said connections, pressure responsive means acting automatically to cut off said first connection to said signal after a predetermined period of time, pressure responsive means acting automatically to cut off said second pressure connection to said signal after a predetermined period of time, and means to deliver pressure to said lock controlling means.

17. In a system of lock control, the combination of a lock, pressure-actuated controlling means for said lock, a source of pressure, an audible signal, a plurality of pressure connections from said source to said signal, manually operable means controlling said connections, and automatic means in each of said pressure connections to cut off pressure to said signal after predetermined periods of time.

18. In a system of lock control, the combination of a lock, pressure-actuated controlling means for said lock, a source of pressure, an audible signal, a plurality of pressure connections from said source to said signal, manually operable means controlling said connections, and automatic means in each of said connections to cut off pressure to said signal at separated intervals and after predetermined periods of time.

19. In a system of lock control, the combination of a lock, pressure-actuated means controlling release of said lock, a source of pressure, a signal, and manually operable means interposed between said source of pressure and said signal and said lock controlling means, to deliver pressure to said signal and to said lock controlling means.

20. In a system of lock control, the combination of a lock, pressure-actuated means controlling release of said lock, a source of pressure, a signal, a manually operable valve interposed between said source of pressure and said signal and said lock controlling means, to deliver pressure to said signal and said lock controlling means.

21. In a system of lock control, the combination of a lock, pressure-actuated means controlling release of said lock, a source of pressure, a signal, a manually operable valve interposed between said source of pressure and said signal and said lock controlling means, means responsive to pressure coming past said valve to actuate said signal, and means responsive to pressure coming past said valve to actuate said lock controlling means.

22. In a system of lock control, the combination of a lock, pressure-actuated means controlling said lock, a pressure pipe, a signal, a manually operable valve interposed between said pipe and said signal and said lock controlling means, a normally closed pressure-actuated piston controlling pressure coming past said valve to said signal, and a normally closed pressure-actuated valve controlling pressure coming past said manually operated valve to said lock controlling means.

23. In a system of lock control, the combination of a lock, pressure-actuated means controlling said lock, a pressure pipe, a signal, a manually operated valve interposed between said source of pressure and said signal and said lock controlling means, a spring closed pressure-actuated piston controlling pressure coming past said valve to said signal, and a spring closed pressure-actuated valve controlling pressure coming past said valve to said lock controlling means.

24. In a system of lock control, the combination of a lock, pressure-actuated means controlling said lock, a pressure pipe, a signal, a manually operable valve interposed between said pipe and said signal and said lock controlling means, a spring closed pressure-actuated piston acting to intermittently open and close a passage leading from said manual valve to said signal, and a spring closed pressure-actuated valve controlling the passage leading from said manual valve to said lock controlling means.

25. In a system of lock control, the combination of a lock, pressure-actuated means controlling said lock, a source of pressure, a signal, a manually operated valve interposed between said source of pressure and said signal and said lock controlling means, a pressure receiving chamber between said valve and said signal, means in said chamber to alternately open and close the passage from said manual valve to said signal, a second source of pressure, a pressure-actuated valve controlling said second source, a pressure-operated diaphragm for operating said valve, and a spring closed pressure-actuated valve controlling the pressure coming from said manual valve to said lock controlling means.

26. In a system of lock control, the combination of a lock, pressure-actuated means controlling said lock, a source of pressure, a signal, a plurality of fluid pressure connections from said source to said signal, a manually operated valve controlling pressure coming from said source, an automatically acting fluid pressure operated device in one of said signal connections to permit fluid pressure to sound said signal for a predetermined period of time, and automatically acting fluid pressure-actuated means in another signal connection operable after the operation of said first named device to deliver pressure to and sound said signal for a predetermined period of time.

27. In a system of lock control, the combination of a lock, pressure-actuated means controlling said lock, a source of pressure, a signal, a plurality of fluid pressure connections from said source to said signal, a manually operated valve controlling pressure coming from said source, an automatically acting fluid pressure operated device in one of said signal connections to permit fluid pressure to sound said signal for a predetermined period of time, and means in another signal connection whose action is initiated by the operation of said first named device to deliver pressure to and sound said signal for a second predetermined period of time.

28. A pressure controlling device for lock control systems comprising, in combination, a manually operable pressure controlling valve, a signal, a pressure-actuated device controlling the passage from said manual valve to said signal, a normally closed valve controlling a pressure passage leading to a lock, and means actuated by pressure coming from said manual valve to open said normally closed valve and deliver pressure to said passage.

29. A pressure controlling device for lock control systems comprising, in combination, a manually operable pressure controlling valve, a signal, a pressure-actuated device controlling the passage from said manual valve to said signal, a normally closed valve controlling a pressure passage leading to a lock, and a diaphragm actuated by pressure coming from said manual valve to open said normally closed valve and deliver pressure to said passage.

30. A pressure controlling device for lock controlling systems comprising, in combination, a manually operable pressure controlling valve, a signal, a pressure-actuated device controlling the passage from said manual valve to said signal, a second pressure-actuated device controlling a passage from said manual valve to said signal, a normally closed valve controlling a pressure passage leading to a lock, a diaphragm actuated by pressure coming from said manual valve to open said normally closed valve and deliver pressure to said passage, and a second pressure-actuated valve in said lock passage.

31. A pressure controlling device for lock controlling systems comprising, in combination, a manually operable pressure controlling valve, a signal, a pressure-actuated device controlling the passage from said manual valve to said signal, a second pressure-actuated device controlling a passage from said manual valve to said signal, a normally closed valve controlling a pressure passage leading to a lock, a diaphragm actuated by pressure coming from said manual valve to open said normally closed valve and deliver pressure to said passage, a second pressure-actuated valve in said lock passage, and operating connections between said last named valve and said manual valve.

32. A pressure controlling device for lock controlling systems comprising, in combination, a manually operable pressure controlling valve, a signal, a pressure-actuated device controlling the passage from said manual valve to said signal, a second pressure-actuated device controlling a passage from said manual valve to said signal, a normally closed valve controlling a pressure passage leading to a lock, a diaphragm actuated by pressure coming from said manual valve to open said normally closed valve and deliver pressure to said passage, a second pressure-actuated valve in said lock passage, and a second valve in said lock passage adapted to be engaged by said manual valve.

33. A pressure controlling device for lock controlling systems comprising, in combination, a manually operable rotary pressure controlling valve, a signal, a pressure-actuated device controlling the passage from said manual valve to said signal, a second pressure-actuated device controlling a passage from said manual valve to said signal, a normally closed valve controlling a pressure passage leading to a lock, a diaphragm actuated by pressure coming from said manual valve to open said normally closed valve and deliver pressure to said passage, a second pressure-actuated valve in said lock passage, and a second valve in said lock passage adapted to be opened by said rotary valve upon predetermined angular movement of said rotary valve.

34. A pressure controlling device for lock controlling systems comprising a valve casing, a pressure pipe communicating with said casing, a second pressure pipe communicating with said casing, a signal pipe communicating with said casing, a connection leading from said casing to the lock controlling instrumentalities, and a single rotary valve controlling said connections.

35. A pressure controlling device for lock controlling systems comprising, in combination, a casing, a second pressure pipe connected with said casing, a signal pipe leading from said casing, a connection leading from said casing to the lock controlling devices, and a single manually operated rotary valve controlling said pressure connections.

36. A pressure controlling device for lock controlling systems comprising, in combination, a casing, a pressure pipe connected with said casing, a signal pipe leading from said casing, a connection leading from said casing to the lock controlling devices, a normally closed pressure operated valve in said lock passage, and a single manually operated rotary valve controlling said pressure connections.

37. A pressure controlling device for lock controlling systems comprising, in combination, a casing, a pressure pipe connected with said casing, a signal pipe leading from said casing, a connection leading from said casing to the lock controlling devices, a normally closed pressure operated valve in said lock passage, and a single manually operated rotary valve controlling said pressure connections, the tail of said last named valve projecting into operative relation to said rotary valve to hold it in open position in certain predetermined angular positions of said rotary valve.

38. The combination of a door, a lock loop carried by said door and movable to operative and inoperative positions, a pivoted bolt adapted to engage said loop, toggle joint mechanism engaging said bolt, a thrust rod connected with said toggle mechanism, a spring to move said thrust rod to straighten said toggle mechanism and hold said bolt in one position relative to said loop, and a fluid pressure operated piston opposed to said spring and adapted, when pressure is applied thereto, to move the thrust rod, toggle mechanism, and bolt to an opposite position.

39. The combination of a railway car having air brake equipment, a door lock carried by said car and having a movable locking element, a fluid pressure control device, a pressure connection from the brake pipe to said control device, a fluid pressure connection from the triple valve to said control device, and fluid pressure-actuated means operated by triple valve pressure coming from said control device to move said locking element in one direction.

40. The combination of a railway car having air brake equipment, a door lock carried by said car and having a movable locking element, a fluid pressure control device, a pressure connection from the triple valve to said control device, fluid pressure-actuated means operated by triple valve pressure coming from said control device to move said locking element in one direction, and independent means to move the locking element in the opposite direction.

41. The combination of a railway car having air brake equipment, a car door, a lock for said door comprising a movable locking element, a fluid pressure control device, a fluid pressure connection from the brake pipe to said control device, a fluid pressure connection from the triple valve to said control device, an audible signal connected with said control device, fluid pressure operated means connected with said control device to actuate said lock, and a manually operable valve in said control device to throw brake pipe pressure to said signal, and triple valve pressure to said lock actuating means.

42. The combination of a railway car having air brake equipment, a car door, a lock for said door comprising a movable locking element, a fluid pressure control device, a fluid pressure connection from the brake pipe to said control device, a fluid pressure connection from the triple valve to said control device, fluid pressure operated means to move said locking element, a fluid pressure connection from said control device to said lock operating means, and a manually movable valve in said control device to reduce brake pipe pressure, apply brakes, and deliver triple valve exhaust pressure to said lock operating means.

43. The combination of a car having air brake equipment, of a car door, a lock for said door comprising a movable locking element, a fluid pressure control device, an audible signal having a fluid pressure connection with said control device, a connection from said brake pipe to said control device, a connection from the triple valve to said control device, pressure operated means to move said locking element, a connection from said lock operating means to said control device, and a manually operable valve in said control device to reduce brake pipe pressure, apply brakes, sound said signal and deliver triple valve pressure to said lock operating means to move said lock.

44. In a lock, the combination of a manually manipulable loop member, a support on which said loop member is slidable, a keeper to receive said loop member when in locking position, and a bolt to engage said loop member.

45. In a lock, the combination of a manually manipulable loop member, a support on which said loop member is slidable, a keeper to receive said loop member, and a spring bolt to automatically snap into and engage said loop member when it is moved to locking position.

46. In a lock, the combination of a manually manipulable loop member, a support on which said loop member is slidable, a bolt to engage said loop member when in locking position, and a housing to receive said loop member when in inoperative position.

47. In a lock, the combination of a housing, a support in said housing, a locking loop movable from inoperative position on said support in the housing to operative position, and a bolt for engaging said loop when in operative position.

48. In a lock, the combination of an open front housing having a protecting marginal wall, a support at the upper end of said housing, a locking loop mounted on said support and adapted to hang when in inoperative position within the wall of said housing, and a bolt adapted to engage said loop when moved to operative position at substantially right angles to the housing.

49. The combination with a railway car provided with fluid pressure brake devices, and a lock adapted to retain a door of the car closed, of means for releasing said lock adapted to be automatically actuated when the fluid pressure brake devices are operated to apply and release the car brakes.

50. The combination with a railway car provided with fluid pressure brake devices, and a lock adapted to retain a door of the car closed, of means for releasing said lock controlled by the exhaust from the fluid pressure brake devices of the car resulting from an operation of said devices to apply and release the car brakes.

51. The combination with a railway car provided with fluid pressure brake devices, and a lock adapted to retain a door of the car closed, of means for releasing said lock controlled by the exhaust from the fluid pressure brake devices of the car resulting from an operation of said devices to apply and release the car brakes, and an audible signal adapted to be sounded during such operation of the car brake devices.

In testimony whereof I have hereunto set my hand.

JAMES AMOS HICKS.